United States Patent

White

[11] 3,889,384
[45] June 17, 1975

[54] TRAILER HITCH GUIDE

[76] Inventor: Max A. White, 12 E. Minnesota, Indianapolis, Ind. 46225

[22] Filed: June 14, 1973

[21] Appl. No.: 369,887

Related U.S. Application Data

[63] Continuation of Ser. No. 143,556, May 14, 1971.

[52] U.S. Cl............... 33/264; 33/DIG. 1; 116/28 R
[51] Int. Cl.................................................. G01c 5/00
[58] Field of Search......... 33/264, DIG. 1; 116/28 R

[56] References Cited
UNITED STATES PATENTS

| | | | |
|---|---|---|---|
| 2,815,732 | 12/1957 | Majors | 33/264 |
| 2,884,698 | 5/1959 | Wursch | 33/75 |
| 2,984,011 | 5/1961 | Hamilton | 33/264 |
| 3,015,162 | 1/1962 | Bohnet | 33/264 |
| 3,080,656 | 3/1963 | Olliff | 33/DIG. 1 |
| 3,159,917 | 12/1964 | Whitehead | 33/264 |

Primary Examiner—Richard E. Aegerter
Assistant Examiner—John W. Shepperd

[57] ABSTRACT

A guide to facilitate the hitching of a towing vehicle to a trailer. A pair of straight and rigid rods are each pivotally mounted atop a pair of housings having magnets therein. One of the magnetic housings is removably securable to the towing vehicle whereas the other magnetic housing is removably securable to a trailer. One of the rods has a ball receiver secured thereto whereas the second rod has a ball slidably mounted thereto. The ball has a plurality of ridges contacting the second rod.

8 Claims, 5 Drawing Figures

INVENTORS
Max A. White

By
Woodard, Weikart,
Emhardt & Naughton
Attorneys

PATENTED JUN 17 1975　　3,889,384

SHEET 2

INVENTORS
Max A. White

By
Woodard, Weikart,
Emhardt & Naughton
Attorneys

TRAILER HITCH GUIDE

This is a continuation of application Ser. No. 143,556, filed 5/14/71.

BACKGROUND OF THE INVENTION

1. Field of the Invention

This invention is in the field of sights or guides for trailer hitches.

2. Description of the Prior Art

The pulling of a trailer by an automobile, truck, tractor and other powered vehicles is a very common practice. One difficulty inherent in this practice is the initial coupling of the powered vehicle to the trailer. The difficulty encountered is due to the fact that the coupling device or hitch is generally not in the field of vision of the operator of the powered vehicle. Thus, the coupling of the two vehicles is accomplished by the trial and error method of frequent backing and correcting until the coupling components on the two vehicles are sufficiently well aligned to allow joining. This is a very time consuming process and as a result several devices have been provided to assist the operator of the powered vehicle in the coupling process. A representable sample of the prior art is disclosed in the following U.S. Pat. Nos. 2,815,732 issued to Majors; 3,015,162 issued to Bohnet; 3,159,917 issued to Whitehead; and 3,363,318 issued to Folkins et al.

The prior art devices are typically rather expensive to produce and thus, they are undesirable. The guiding device disclosed herein is characterized by its simplicity with the result of a very low production cost. The number of parts has been reduced to a minimum. The device disclosed herein is also characterized by the ease with which the guiding device is adjustable depending upon the requirements of the towing vehicle and the trailer.

SUMMARY OF THE INVENTION

One embodiment of the present invention is a guide to facilitate hitching of a towing vehicle to a trailer comprising: a first housing having a magnet therein removably securable to the trailer; a first rigid and straight rod; a first sleeve pivotally mounted atop the first housing and having a first threaded member extending therein, said first rod extending into said first sleeve and being removably secured thereto by said first member; a ball receiver mounted to the first rod; a second housing having a magnet therein removably securable to the vehicle; a second rigid and straight rod; a second sleeve pivotally mounted atop said second housing and having a second threaded member extending therein, said second rod extending into said second sleeve and being removably secured thereto by the second member; and, a ball mounted to the second rod and movable thereon, the ball being fittable into the receiver.

It is an object of the present invention to provide a new and improved guiding device to facilitate hitching of a vehicle to a trailer.

It is an additional object of the present invention to provide a guide to facilitate the hitching of a vehicle to a trailer which is relatively inexpensive to produce.

Yet another object of the present invention is a guide to facilitate hitching of a vehicle to a trailer which is relatively easy and quick to mount to the vehicle and trailer.

Related objects and advantages of the present invention will be apparent from the following description.

DESCRIPTION OF THE PREFERRED EMBODIMENT

Figure 1:
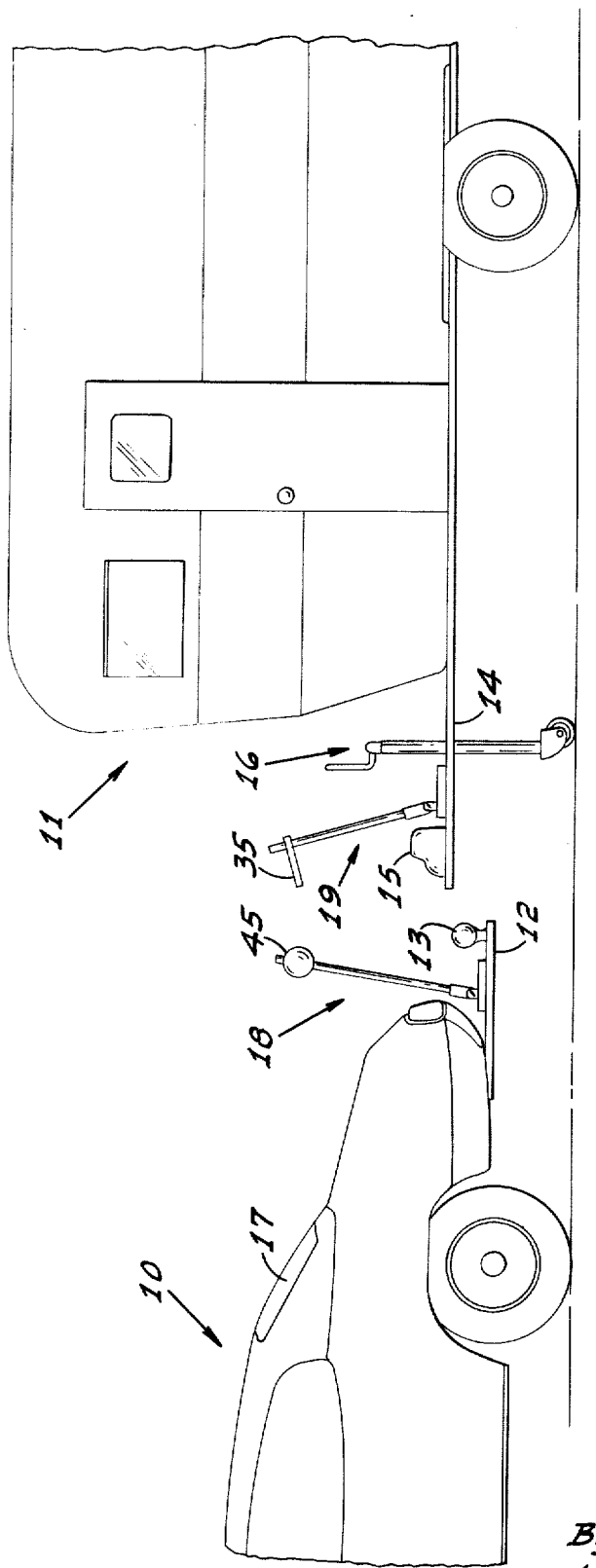
FIG. 1 is a fragmentary side view of a powered vehicle and a trailer having the trailer hitch guide of the present invention mounted thereon.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a guide to facilitate the hitching of a towing vehicle 10 to a trailer 11. The guide is composed of a ball guide 18 and a receiver guide 19. Vehicle 10 has the traditional trailer hitch 12 with a spherical hitch ball 13 mounted thereto. Trailer 11 has the conventional trailer tongue 14 with a socket lock 15 for receiving and coupling the trailer to vehicle 10. A conventional trailer jack 16 is mounted to trailer 11 for supporting the forward end of the trailer when not coupled to another vehicle. These trailer jacks are commercially available and typically have a crank handle for raising the ground engaging portions of the jack so as to store the jack away from the ground when the trailer is coupled to the powered vehicle.

Figure 2:
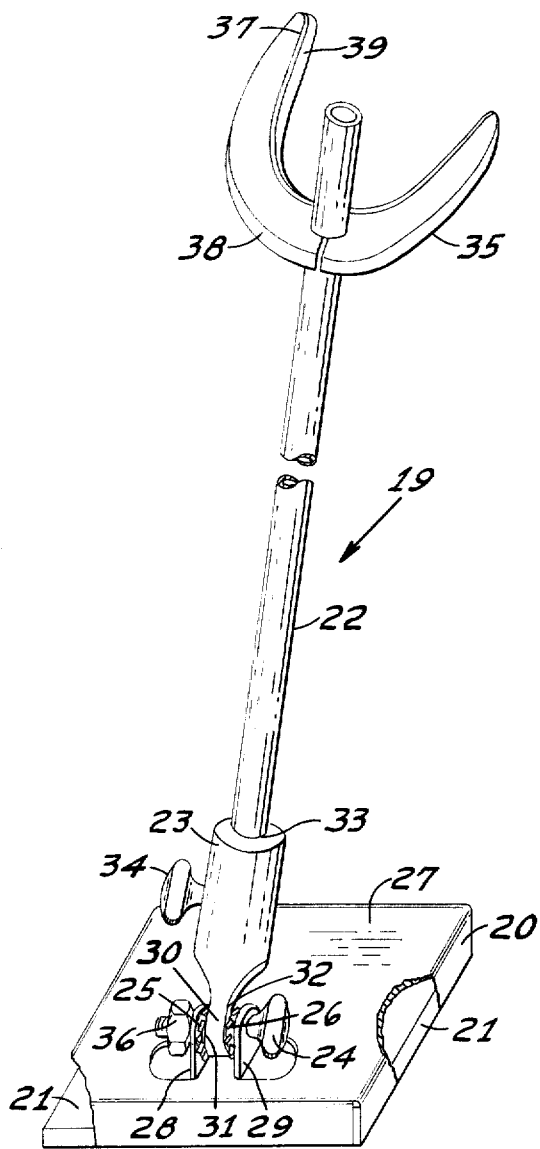
FIG. 2 is an enlarged fragmentary perspective view of the receiver guide 19 of FIG. 1.

FIG. 2 is an enlarged fragmentary perspective view of receiver guide 19. Receiver guide 19 has a metal base housing 20 with a magnet 21 secured therein. Housing 20 is shown cut away so as to more fully illustrate magnet 21 which extends the length and width of the housing. Magnet 21 is configured as a sheet. These sheet magnets are commercially available from the Minnesota Mining and Manufacturing Company, 2501 Hudson Road, St. Paul, Minn. 55119. Housing 20 is five-sided having an open bottom so as to allow the magnetic field to extend outwardly thereby holding the housing to a metal structure such as a trailer hitch or trailer tongue. The housing is made from metal such as to concentrate the magnetic field of the magnet downwardly. The top wall 27 of the housing has a pair of parallel upstanding brackets 28 and 29 integrally attached to the housing and receiving the bottom end 30 of sleeve 23. A rigid rod 22 extends into the sleeve and has a ball receiver 35 mounted thereon. Sleeve 23 is generally cylindrical with the bottom end 30 being necked down so as to have opposite flat sides 31 and 32 positioned between and adjacent brackets 28 and 29. A thumb screw 25 extends through the brackets and the sleeve bottom end being threadedly received by hexagonally shaped nut 36. A pair of external star-shaped lock washers 25 and 26 are positioned between bottom end 30 and respectively brackets 28 and 29. Thus, sleeve 23 is pivotally mounted atop the housing. Thumb screw 24 may be loosened and rod 22 pivoted to the desired location with screw 24 then being tightened to secure the rod in the position. Sleeve 23 is hollow at location 33 so as to removably receive rod 22. A thumb screw 34 extends into the hollow center of sleeve 23 having an end abuttingly engaging rod 22 and securing the rod within the sleeve. The rod may be removed from the sleeve by merely loosening screw 34. Rod 22 is rigid and straight being produced from a metal such as aluminum. Best results have been obtained by using aluminum tube material for rod 22 having an outside diameter of one-fourth inch.

Ball receiver 35 having the general shape of a horseshoe is slidably mounted to rod 22 and adjustable to any position on the rod. The receiver has an outer periphery 38 and an inner periphery 37. A light reflective material 39 is secured to the inner periphery to facilitate visual sighting of the receiver. The light reflective material may be a brilliant colored tape such as the color red which is secured to the inner periphery by adhesive means. Receiver 35 may be produced from plastic having a hole in the base which is tightly fitted with respect to rod 22 so that the receiver may be moved to the desired position along the length of the rod and then held thereat.

Figure 3:
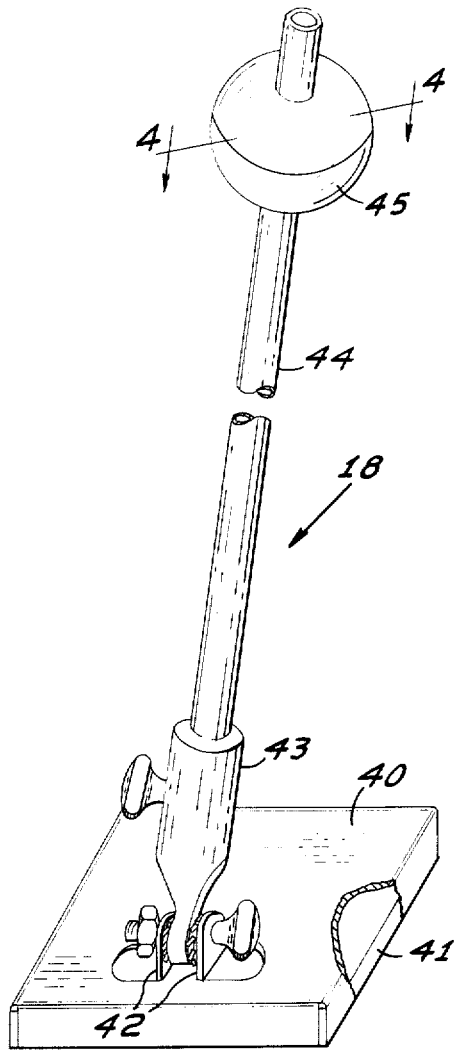
FIG. 3 is an enlarged fragmentary perspective view of the ball guide 18 of FIG. 1.

Ball guide 18 is shown in FIG. 3. Ball guide 18 has a housing 40 and a magnet 41 identical to that previously described for housing 20 and magnet 21. In addition, housing 40 has a pair of parallel upstanding brackets 42 identical to brackets 28 and 29 which receive sleeve 43 identical to sleeve 23. A straight and rigid rod 44 identical to rod 22 is received by sleeve 43 and has a ball 45 slidably mounted thereto.

Figure 4:
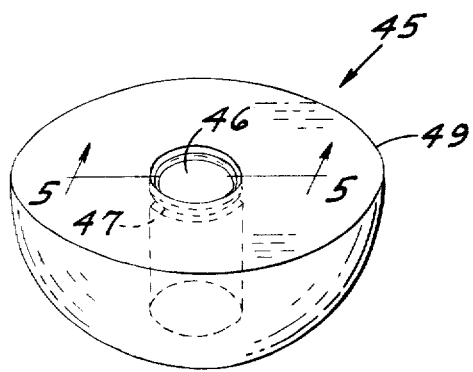
FIG. 4 is a perspective cross-sectional view of one hemisphere of the ball taken along the line 4—4 of FIG. 3 and veiwed in the direction of the arrows.
Figure 5:
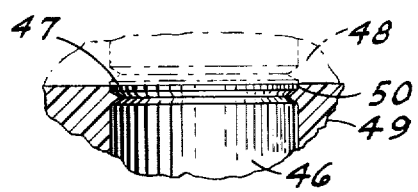
FIG. 5 is an enlarged fragmentary cross-sectional view to show ridge 47 and taken along the line 5—5 of FIG. 4 and viewed in the direction of the arrows.

FIG. 4 is a perspective cross-sectional view of ball 45 of FIG. 3 taken along the line 4—4 and viewed in the direction of the arrows. Ball 45 is solid with a hollow center 46 for receiving rod 44. Sphere 45 is formed from a material such as plastic and may be formed into a top and bottom piece. The top and bottom pieces would then be secured together by an adhesive or other suitable means. The top hemisphere of ball 45 is shaped and configured identically to the bottom hemisphere 49 shown in FIG. 4. FIG. 5 is an enlarged cross-sectional view taken along the line 5—5 of FIG. 4 and looking in the direction of the arrows. A holding ridge 47 extends around the circumference of hole 46 having a generally V-shape and defining a diameter across the inner ridge peaks less than the diameter of hole 46. That is, the top hemisphere would also have a V-shaped ridge as shown by dashed lines 48 in FIG. 5. The two ridges of the top and bottom hemisphere are separated by a ring cavity 50 having a diameter equal to the diameter of hole 46 and the hole extending through the top hemisphere. Rod 44 extends completely through ball 45 with the plastic flexible V-shaped ridges contacting the rod and securing the ball in the desired location along the length of the rod. A variety of plastic materials, such as polyethylene, may be used to produce ball 45 and the V-shaped ridges therein.

Referring now to FIG. 1, it can be appreciated that the operator of vehicle 10 may view guides 18 and 19 through the back window 17 of the vehicle thereby allowing alignment of the guides and quick coupling of the trailer to the vehicle. Each rod of guides 18 and 19 is pivotably mounted to its respective housing thereby allowing the rods to be pivoted to the desired location. For example, FIG. 1 shows the rod of guide 19 projecting toward vehicle 10 whereas the rod of guide 18 is shown projecting toward trailer 11. This could be arranged with the rod of guide 19 being vertically positioned and the rod of guide 18 being positioned outward toward trailer 11. The guide shown in FIG. 1 may be utilized in a variety of different methods. For example, guide 18 may be mounted to trailer 11 whereas guide 19 may be mounted to vehicle 10 which of course is the reverse of that shown in FIG. 1. After guides 18 and 19 are mounted to vehicle 10 and trailer 11, vehicle 10 should be backed up to trailer 11 until connection is made between ball 13 and lock 15. At this time, ball 45 and ball receiver 35 may be slidably adjusted on the rods of guides 18 and 19 until the ball is received within the horseshoe inner cavity of receiver 35. The ball and ball receiver are thereby indexed on the rods of guides 18 and 19 and will not have to be subsequently moved unless loading conditions change on the vehicle or trailer or unless different trailers or vehicles are utilized. Thus, the operator of vehicle 10 may subsequently couple the vehicle to the trailer without indexing the ball or ball receiver and by merely looking through the back window and aligning the vehicle with respect to the trailer by centering the ball within the ball receiver. In many cases, it may be desirable to mount guides 18 and 19 horizontally in lieu of the general vertical position shown in FIG. 1. Thus, the magnetic bases of each guide may be attached to any metal vertical surface such as the side walls of hitch 12 and tongue 14. The operator of the vehicle may then look out the side window of vehicle 10 in lieu of the rear window to center the ball with respect to the ball receiver.

It will be evident from the above description that the present invention provides a new and improved guide to facilitate hitching of a towing vehicle to a trailer. It will be further evident from the above description that this guide is relatively inexpensive to produce and may be quickly and easily mounted to the towing vehicle and to the trailer.

Various electrical devices may also be utilized with the invention disclosed herein. For example, small switches may be mounted so as to be actuated by the movement of the rods thereby connecting an electric light to a source of electrical energy and showing the proximity of the rods. The same may be done with respect to the ball and ball receiver in order to indicate when the ball is positioned within the receiver.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A guide to facilitate hitching of a towing vehicle to a trailer comprising:

a first housing having a flat sheet magnet therein removably securable to said trailer, said housing being metal such as to concentrate the magnetic field of said flat sheet magnet;

a first rigid and straight rod;

a first sleeve pivotally mounted atop said first housing and having a first threaded member extending therein, said first rod extending into said first sleeve and being removably secured thereto by said first member;

a ball receiver mounted to said first rod;

a second housing having a second flat sheet magnet therein removably securable to said vehicle, said second housing being metal such as to concentrate the magnetic field of said second flat sheet magnet;

a second rigid and straight rod;

a second sleeve pivotally mounted atop said second housing and having a second threaded member extending therein, said second rod extending into said second sleeve and being removably secured thereto by said second member; and, a ball mounted to said second rod and movable thereon, said ball being fittable into said receiver; and wherein:

said ball receiver has a hollow center receiving said second rod with a plurality of ridges abuttingly engaging said second rod, said ball having a top and bottom hemisphere with mating surfaces secured together, with said ridges being positioned adjacent said mating surfaces, said ridges being spaced apart by a ring cavity.

2. The guide of claim 1 wherein each of said ridges is V-shaped and has an inside diameter less than the diameter of said hollow center.

3. The guide of claim 2 wherein:

said first housing and said second housing each have a top wall with a pair of parallel upstanding brackets integrally connected thereto; and, said first sleeve and said second sleeve each have a bottom end portion with opposite flat sides positioned between and adjacent said brackets.

4. A guide to facilitate hitching of a towing vehicle to a trailer comprising:

a first housing having a magnet therein removably securable to said trailer;

a first rigid and straight rod;

a first sleeve pivotally mounted atop said first housing and having a first threaded member extending therein, said first rod extending into said first sleeve and being removably secured thereto by said first member;

a ball receiver mounted to said first rod;

a second housing having a magnet therein removably securable to said vehicle;

a second rigid and straight rod;

a second sleeve pivotally mounted atop said second housing and having a second threaded member extending therein, said second rod extending into said second sleeve and being removably secured thereto by said second member;

a ball mounted to said second rod and movable thereon, said ball being fittable into said receiver; and wherein:

said ball has a hollow center receiving said second rod with a plurality of ridges abuttingly engaging said second rod;

each of said ridges is V-shaped and they are spaced apart, each of said ridges has an inside diameter less than the diameter of said hollow center;

said first housing and said second housing each have a top wall with a pair of parallel upstanding brackets integrally connect thereto; and, said first sleeve and said second sleeve each have a bottom end portion with opposite flat sides positioned between and adjacent said brackets;

said receiver is configured in the shape of a horseshoe and is slidably mounted to said first rod, said receiver has a light reflective material secured to the inner periphery of said horseshoe;

said magnet in said first housing and said magnet in said second housing are each sheet configured; and, said first housing and said second housing are metal such as to concentrate the magnetic fields of said magnets.

5. The guide of claim 4 wherein: said ball has a top and bottom hemisphere secured together with each hemisphere having a V-shaped ridge with an inside diameter less than the diameter of said hollow center, said ridges being spaced apart by a ring cavity of a diameter equal to the diameter of said hollow center.

6. The guide of claim 5 wherein:

said top hemisphere is secured to said bottom hemisphere by adhesives and said ridges are of plastic flexible material.

7. A guide to facilitate hitching of a towing vehicle to a trailer comprising:

a first housing assembly having a flat sheet magnet therein removably securable to said trailer, said assembly including metal sheets positioned outwardly of said magnet such as to concentrate the magnetic field of said flat sheet magnet;

a first rigid and straight rod;

a first sleeve pivotally mounted atop said first housing assembly and having a first threaded member extending therein, said first rod extending into said first sleeve and being removably secured thereto by said first member;

a receiver mounted to said first rod;

a second housing assembly having a second flat sheet magnet therein removably securable to said vehicle, said second housing assembly including metal sheets positioned outwardly of said second magnet such as to concentrate the magnetic field of said second magnet;

a second rigid and straight rod;

a second sleeve pivotally mounted atop said second housing assembly and having a second threaded member extending therein, said second rod extending into said second sleeve and being removably secured thereto by said second member; and a round element mounted to said second rod and movable thereon, said round elements being fittable into said receiver; and wherein:

said round element has a hollow center receiving said second rod with a plurality of plastic ridges abuttingly engaging said second rod.

8. The guide of claim 7 wherein:

said receiver is configured in the shape of a horseshoe and is slidably mounted to said first rod;

said first housing assembly and said second housing assembly each have a top wall with an upstanding bracket integrally connected thereto, each bracket having a flat vertical surface through which a threaded member extends; and, said first sleeve and said second sleeve each have a flat vertical surface adjacent said flat vertical surface of said brackets of each of said first housing assembly and said second housing assembly.

* * * * *